_United States Patent Office_

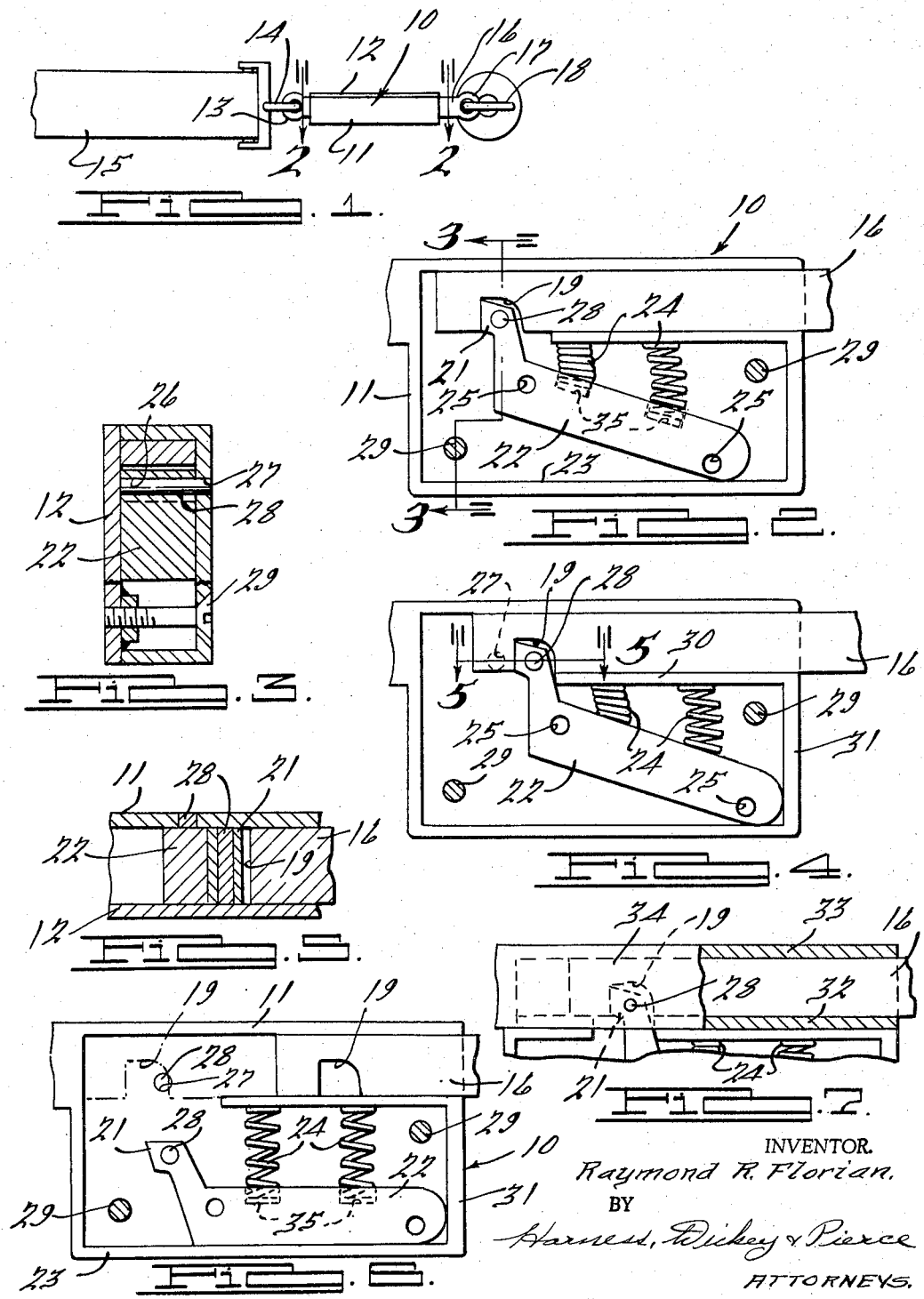

3,237,265
Patented Mar. 1, 1966

1

3,237,265
SAFETY RELEASE DEVICES
Raymond Ralph Florian, 828 Adams St., Monroe, Mich.
Filed May 19, 1964, Ser. No. 368,523
5 Claims. (Cl. 24—230)

This invention relates to safety release devices and, particularly, to a safety device which releases after a shock load has been applied and removed therefrom.

The safety device of the present invention has many applications. One, for example, would be that of applying the device to an end of a safety belt of an occupant of a vehicle. The belt buckle may be inaccessible after a crash and the immediate removal of the occupant may be prevented. This has proved fatal in many instances when the car is on fire, is in danger of falling over a cliff or of being struck by another car. The safety device of the present invention withstands the shock of impact and holds the occupant so long as his weight is on the belt. When the weight is removed, the safety device of the present invention uncouples and thereby releases the belt so that the occupant can be quickly removed.

The device embodies a housing with a coupling ring at one end for attachment to one end of the belt and a slide bar therewithin having a ring thereon which is attachable to the fixed ring in the vehicle. A notch is provided on the inner end of the slide bar in which the retaining end of a blocking finger is secured by a shear pin which passes through the end and the adjacent wall of the housing within the notch in the slide bar. Springs are provided for urging the finger downwardly in the housing away from the slide bar and out of the notch thereof. This will occur when pressure is released between the housing and the slide bar which permits the slide bar to move from the housing. Thereafter, the slide bar is inserted in the housing and the finger is moved into the slide bar notch and retained in position by a new shear pin.

Accordingly, the main objects of the invention are: to provide a safety device which withstands normal loads and becomes activated under a shock load remaining effective to support the load until it is removed; to provide a safety device having a slide bar retained within a housing by a spring-operated finger which is held within a notch in the bar by a shear pin which becomes sheared under shock load while the finger retains its engagement with the notch until the load is removed, whereupon the slide bar separates from the housing; to provide a safety device which may be used over and over again by the replacement of a shear pin in a finger which locks a slide bar in position within a housing in a manner to withstand normal forces but which becomes activated under shock load to permit the bar to be released after the load is removed; and, in general, to provide a safety device which is simple in construction, positive in operation and economical to manufacture.

Other objects and features of novelty of the invention will be specifically pointed out or will become apparent when referring, for a better understanding of the invention, to the following description taken in conjunction with the accompanying drawing, wherein:

FIGURE 1 is a plan view of a safety device of the present invention when applied to a safety belt;

FIGURE 2 is an enlarged sectional view of the structure illustrated in FIGURE 1 taken on the line 2—2 thereof;

FIGURE 3 is a sectional view of the structure illustrated in FIGURE 2 taken on the line 3—3 thereof;

FIGURE 4 is a view of the structure illustrated in FIGURE 2 when the securing pin has been sheared;

FIGURE 5 is a sectional view of the structure illustrated in FIGURE 4 taken along the line 5—5 thereof;

2

FIGURE 6 is a view of the structure illustrated in FIGURES 2 and 4 showing the separation of the elements thereof; and FIGURE 7 is a fragmentary sectional elevational view of a slightly modified form of construction.

The safety device 10 of the present invention is illustrated in FIGURE 1 as having a housing 11 with a removable cover 12 with the housing containing an eye 13 which is secured to a ring 14 of a safety belt 15. A slide bar 16 extends from the end of the housing opposite to that having the eye 13 with the extending end of the slide bar having an eye 17 which is secured to the ring 18 which is attached to the body floor or the body of the automobile. The slide bar 16 has a notch 19 on the end opposite that having the eye 17 which is engaged by an end 21 on a finger 22 which is urged downwardly against a wall 23 of the housing by springs 24. The lower ends of these springs rest in recesses 35 (FIGURE 6) formed in the finger 22. In the embodiment of the present invention, the finger 22 is secured in the position illustrated in FIGURE 2 by removable pins 25 which align the shear hole 26 through the finger 22 with the shear hole 27 in the housing 11. A shear pin 28 is then passed through the apertures 26 and 27 and the cover 12 is then attached to the housing by a pair of screws 29. Thereafter, the pins 25 are removed and the safety device will withstand normal usage to which it would be subjected from the use of the belt 15. The shear pin may be made out of any type material, iron, brass, plastic, and the like, depending upon the load to which it will be subjected during normal use and which will shear under shock load. Not only can the control of the shearing of the pin 28 be changed by changing the material of the pin 28, but the diameter of the apertures can also be varied, which is desirable, when the safety device is to be employed other than on safety belts.

When a crash occurs, a shock load is applied to the belt 15 and the pin 28 is sheared in the manner as illustrated in FIGURE 4, the shock load being taken on the eye 13 of the housing and the ring 17 of the slide bar 16. The finger 22 will be moved toward the housing wall 31 and will be fixed against the wall 31 and the wall 23, with the end 21 of the finger maintained within the notch 19 of the slide bar 16. The movement between the slide bar and housing occurs in such a rapid manner that the springs 24 are ineffective to move the end 21 and the finger 22 against the wall 23. Upon the removal of the load against the belt 15, the spring 24 then becomes effective to rock the finger 22 down against the wall 23 into the position illustrated in FIGURE 6 where the end 21 of the finger is entirely moved from the notch 19 in the slide bar 16 which separates from the housing 10. Thereafter, the slide bar 16 is moved within the housing 11 and the pins 25 are inserted in position to have the end 21 extended in the notch 19 of the slide bar, whereupon the shear pin 28 can be inserted through the end and through the housing.

It is to be understood that in FIGURE 7, a further form of the invention is illustrated. In this form of construction, the cover 12 extends to the bottom portion 32 of a casing 33 rectangular in cross section. This casing provides spaced side walls 34, one on each side of the slide bar 16, to permit the pin 28 to extend therethrough so that both ends of the pin must be sheared. This permits the use of a smaller diameter pin as well as pins made of harder material so that the pin will not be damaged during normal use of a belt or for any other purpose that the safety device is employed. The casing 33 forms a channel-shaped recess for the slide bar 16.

While two commercially practical embodiments of the invention have been described and illustrated herein somewhat in detail, it will be understood that various changes may be made as may come within the purview of the accompanying claims.

What is claimed is:

1. In a safety device, a housing, a slide bar within the housing having a notch, a finger within the housing extending within the notch, spring means urging said finger from said notch, and a shear pin retaining said finger within said notch.

2. In a safety device, a housing, a slide bar within the housing having a notch, a finger within the housing extending within the notch, spring means urging said finger from said notch, a shear pin retaining said finger within said notch, and stop means for limiting the movement of the finger and the slide bar after the pin has been sheared while the shearing load is present between the housing and the slide bar.

3. In a safety device, a housing having an attaching means at one end, a slide bar having attaching means at one end and a notch at the other end and insertable within said housing, a finger within said housing extending within said notch retained therein by a shear pin, and spring means for urging said finger from said notch.

4. In a safety latch, a housing, a slide bar within said housing having a notch, securing means on the housing and slide bar, finger means extending within the notch for retaining the slide bar within the housing, a shear pin connecting said slide bar and finger, and spring means for urging said finger from said notch after a load has sheared the pin and said load is removed from said securing means.

5. In a safety device, a housing, a slide bar in said housing, latch means for securing said slide bar within the housing, shear means for releasing said latching means, friction means for retaining said latching means in position for latching said slide bar after said shear means is released, and spring means for releasing said latch means from said slide bar upon the removal of the load therefrom.

References Cited by the Examiner

UNITED STATES PATENTS 2,522,790   9/1950   Johnston.
3,139,660   7/1964   Foster.

WILLIAM FELDMAN, *Primary Examiner.*